J. F. O'CONNOR.
SHOCK ABSORBER.
APPLICATION FILED APR. 27, 1918.

1,302,079.

Patented Apr. 29, 1919.

WITNESSES:
Wm. Geiger

INVENTOR.
John F. O'Connor
BY George I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBER.

1,302,079.   Specification of Letters Patent.   Patented Apr. 29, 1919.

Application filed April 27, 1918. Serial No. 231,101.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbers, of which the following is a full, clear, concise, and exact description, reference being had to the accompanying drawings, forming a part of this specification.

This invention relates to improvements in shock absorbers.

The object of the invention is to provide a simple, efficient and relatively cheap shock absorber for automobiles and the like, said shock absorber providing a combined frictional and spring resistance and composed of a minimum number of parts.

Figure 1:
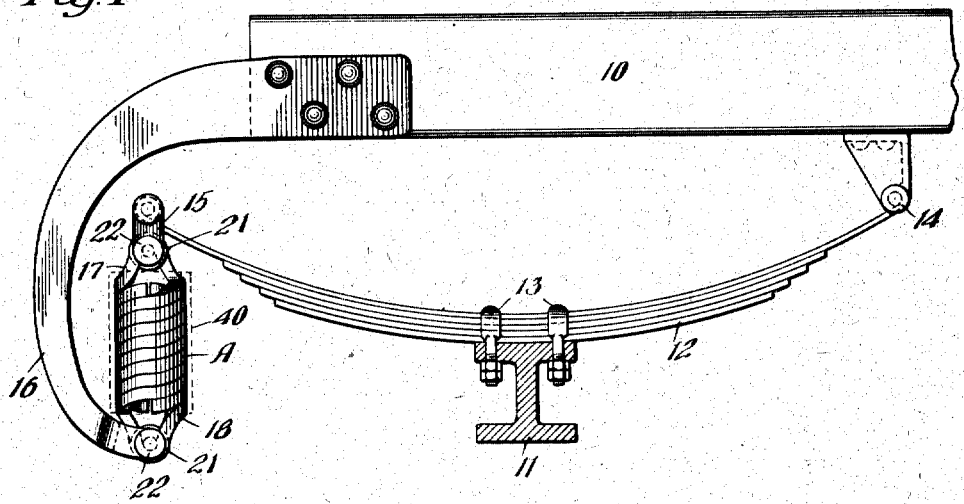
Figure 2:
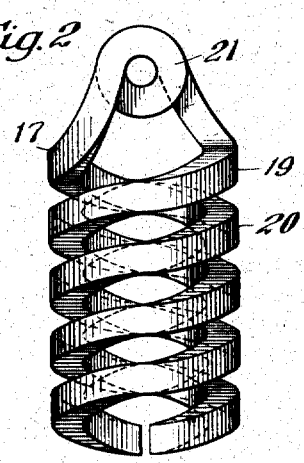

In the drawing forming a part of this specification, Figure 1 is a part side elevational view of a portion of an automobile chassis and spring showing my improvements in connection therewith, the axle of the vehicle being shown in section. And Fig. 2 is a detail view illustrating one of the elements employed in the formation of the shock absorber.

In said drawing, 10 denotes one element of an automobile chassis, 11 a transversely extending axle, 12 the semi-elliptic main spring of the usual type secured to the axle 11, as indicated at 13, and at one end to the chassis, as indicated at 14. At its opposite end, the spring 12 is provided with the usual pair of compensating links 15—15, said links being attached to one end of the improved shock absorber designated generally by the reference A. The opposite end of the shock absorber A is pivotally connected to an extension 16 secured to the member 10 of the chassis.

The shock absorber, as shown, consists of two elements 17 and 18, both of identical formation. Each of said members preferably consists of a single, square section bar of spring material formed with two spring coils 19 and 20, said coils being of the same pitch and diameter but angularly offset 180° with respect to each other, as shown in Fig. 2. The coils 19 and 20 of both members are united at one end by integral portions of the bars, the latter being preferably formed with integral loops 21 to form suitable means for receiving the pivot pins 22—22 by which the shock absorber is connected to the links 15 and extension 16. Not only are the coils 19 and 20 of the same pitch and diameter, but the pitch is so made that the spaces between the coils when the latter are angularly offset 180°, will just accommodate similar coils of the other element. In other words, the two elements 17 and 18 are made of identical formation and then intercoiled by twisting the one into the other. This forms a substantially solid spring, as shown in Fig. 1, the spring being comprised of four intercoiled and interlocked coils. In order to prevent any possible relative lateral movement of the two elements 17 and 18, I preferably employ an outside tubular shell or casing 40 indicated by dotted lines in Fig. 1. This is slipped over the interlocked elements and serves to protect the device from dirt, weather, etc.

In absorbing the excessive shocks, the two elements 17 and 18 of the shock absorber A will be stretched or extended in the usual manner of coil springs and in addition, a large frictional area will be developed between the interlocking, intercoiled springs, thus producing a shock absorber of relatively high capacity and well adapted for the purposes intended.

From the preceding description, it will be seen that the shock absorber which I have developed is composed of few parts; is compact; can be easily and relatively cheaply manufactured; and will not be materially affected by dirt, dust or other foreign matter when in service.

I claim:

1. A shock absorber adapted to be interposed between two members of a vehicle or the like and including, two elements, each of said elements comprising a double coiled spring, the coils of one element being frictionally interlocked with the coils of the other element.

2. As an article of manufacture, a shock absorber for vehicles and the like, said shock absorber comprising two elements, each of said elements having a pair of spring coils integrally formed therein, said coils being of the same pitch and diameter with the coils offset angularly 180°, the coils of one of said elements being intertwined with the coils of the other element.

3. As an article of manufacture, a shock absorber for vehicles and the like, said shock absorber comprising two elements, each of said elements having a pair of spring coils integrally formed therein, said coils being of the same pitch and diameter with the coils offset angularly 180°, the coils of one of said elements being intertwined with the coils of the other element, each of said elements having an integrally formed loop by which it is adapted to be pivotally attached to members of the vehicle.

In witness that I claim the foregoing I have hereunto subscribed my name this 12th day of April, 1918.

JOHN F. O'CONNOR.

Copies of this patent may be obtained for five cents each, by addressing the "Commissioner of Patents, Washington, D. C."